Millage M. White  Inventor

Millage M. White  Inventor

United States Patent Office 3,032,653
Patented May 1, 1962

3,032,653
PROFILING OF FLUID INJECTION WELLS
Millage M. White, Tulsa, Okla., assignor, by mesne assignments, to Jersey Production Research Company
Filed Mar. 8, 1957, Ser. No. 644,914
9 Claims. (Cl. 250—43.5)

This invention relates to a method and device for studying subsurface formations. It relates more particularly to a method and device for determining the injectivity profile or permeability of underground formations penetrated by a well bore.

The need for a method and device capable of determining the pattern of injection of a fluid into a formation from a well bore for repressurization or pressure maintenance of a natural underground reservoir or for underground gas storage has vastly increased in recent years. For improved reservoir engineering studies designed to increase the ultimate recovery from underground reservoirs, it is important to know which zone or portions of an underground formation are receiving gas or other fluid from the well bore and the relative quantity of the gas or fluid being injected into each of the various zones or sections of the formation. This invention discloses a method and apparatus for determining the injectivity profile of an underground formation. This invention may also be used in selective treatment of sections or portions of underground formations.

The prior art discloses a method of making an injection profile in which two streams of water are pumped into a well, one stream into a string of tubing extending downwardly below the formation and the other stream flowing downwardly through the annular space between the tubing and the casing or between the tubing and the wall of the hole. A small amount of a radioactive substance is added to one of the streams of water but not to the other. A radioactivity detector is passed through the tubing with its depth being recorded, and from a change in the output of the detector, the approximate depth of the interface may be determined.

There are certain objections and disadvantages to the use of the method of the prior art, among those being that the radioactive material enters the formation with the result that a gamma ray log of natural radiation cannot be made following a survey by the method of the prior art until after the radiation of the injected material has decayed sufficiently for its effect on the natural radiation to be considered negligible. This prior art method, furthermore, is of doubtful value for locating the interface while surveying a gas injection well due to mixing of gas across the interface which causes the radioactivity count received by the detector to decrease or increase as the case may be over a band several feet wide instead of a few inches as representative of a sharp interface. The exact location of the interface in the wide band cannot be determined. There is also considerable handling of radioactive substances which is a potential health hazard to the attending personnel. Again, after the radioactive fluid has entered a formation, it becomes quite difficult to determine the location of the interface in that portion of the formation contaminated by the radioactive substance. The detector will receive emisssion from the radioactive substance deposited in the formation in addition to emissions from the water in the annulus which makes it exceedingly difficult to determine when emissions are received as a result of the detector crossing the interface as the response will not be a sharp increase. These objections and disadvantages are overcome and eliminated by the present invention which discloses a different and an improved method and apparatus for determining the injectivity profile of a fluid injection well as will be seen.

In accordance with this invention, an elongated cage is suspended vertically adjacent or alongside the lower portion or modified pipe extension of a string of producing tubing which is suspended within a casing or well bore. An opening is provided in the lower portion of the tube or pipe extension for permitting the flow of fluid therethrough into the bottom portion of the well bore. A radioactive ball is contained in the elongated cage and has free vertical movement therein. The pipe or tubing and the elongated cage are then run as close to the bottom of the hole as practical and at least through the formation to which the injection profile is to be made. A fluid is injected downwardly through the tubing and a separate fluid stream is injected downwardly through the annulus or annular space between the tubing and casing or between the tubing and the wall of the well bore with each quantity of fluid being metered separately. As the fluid leaves the opening in the lower portion of the tubing or extension thereof, it will flow substantially upwardly through the annulus and outward into the formation. During this injection, an interface is established in the annulus between the two separate streams.

The radioactive ball confined within the above-mentioned elongated cage will be blown or carried vertically to the point of zero velocity of the fluid which will be at the interface. The location of the ball is determined by a radiocativity detector which is run through the tubing. When the detector is just opposite or at the same depth as the ball, the emissions from the radioactive ball will cause full response on the detector which will be transmitted to the surface. The depth of the interface is then determined by measuring the depth of the detector which is opposite the ball which in turn is at the interface.

The rates of injection of the two streams can be varied by means of control valves located at the surface with the rates being adjusted so that at all times the total amount of fluid being injected by the two streams is consant. By increasing the amount of fluid being injected through the tubing and with the correspondingly decreasing amount of fluid being injected through the annulus the interface will be raised. Rates of injection in the two streams can be varied by increments thus moving the interface up or down as desired. After each change in rate or ratio between the two streams, the depth of the new interface is noted or recorded. The change in rate of injection is also noted for determining the amount of fluid being injected into the vertical segment of the formation as defined by the vertical movement over which the interface moves. By repeating this process and by comparing the change in depth of interface with respect to the change in injection rate for the entire vertical thickness of the underground formation, the injectivity profile can be prepared.

It is usually desirable to position the interface at either the top or bottom of the formation for which the injectivity profile is desired. The interface is then lowered or raised as the case may be in vertical segments over the entire section or formation under study. If it is desired to start at the top of the formation, this may be accomplished by injecting the total volume of injection fluid through the tubing so that all the fluid will be injected in the well bore below or at the bottom of the formation being tested or under study. By increasing in increments the amount of fluid being injected from about the formation and correspondingly decreasing the amount of fluid being injected from below the formation the interface may be lowered over the entire thickness of the formation at which point essentially all the fluid will be injected from above the formation through the annulus and none through the tubing. It should also be noted that with this invention it is not necessary to consider variations in well bore diameter.

Reference is now made to the accompanying drawing in which.

Figure 1:
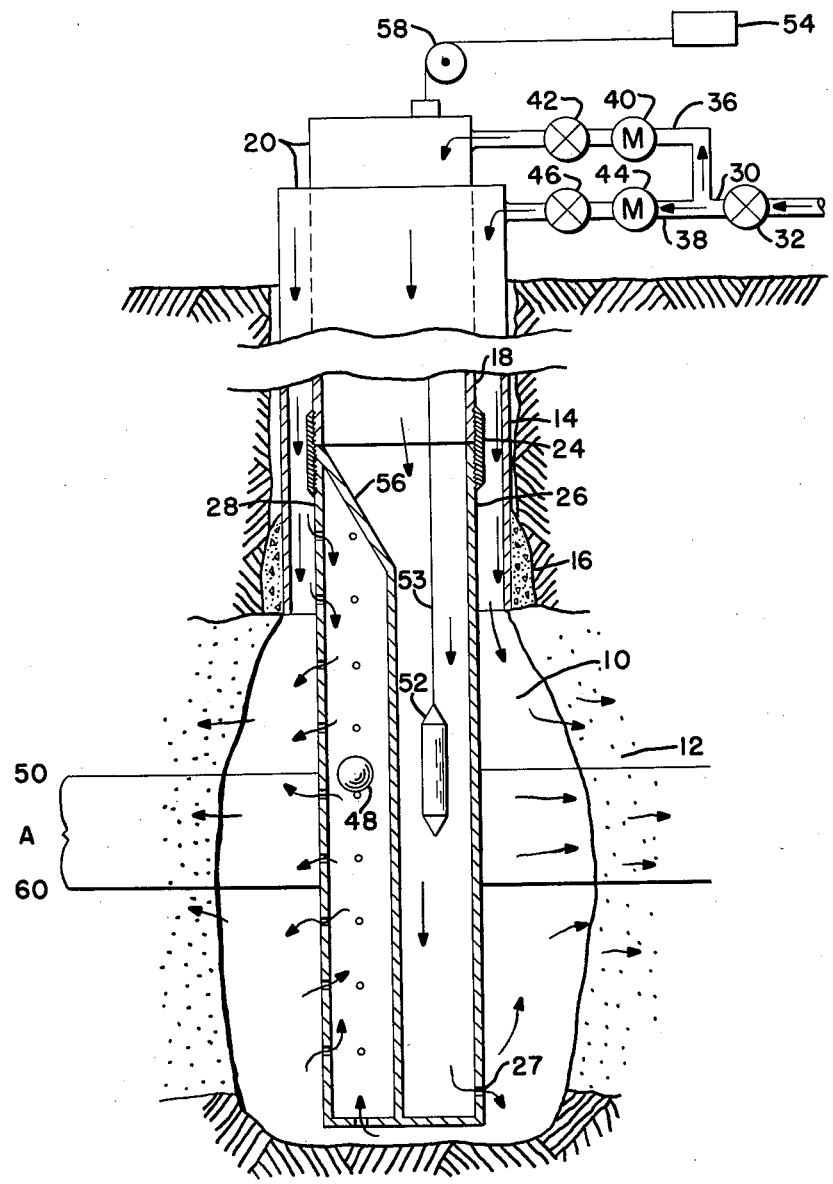
FIGURE 1 represents a vertical sectional view showing the device or apparatus required for making a fluid injection profile.

Referring to the drawing, a well bore or hole 10 is shown as traversing or penetrating an underground formation 12 for which it is desired to make a fluid injection profile. The upper portion of the well bore is shown as being provided with casing 14 and cemented at 16. A tubing 18 is suspended within the well bore 10 or casing 14. Well head connection 20 closes the upper portion of the casing 14 and tubing 18. Adaptor 24 is provided at the lower end of tubing 18 for attaching pipe 26 and pipe or elongated cage 28 thereto. Pipe 26 is in fluid communication with tubing 18 and is provided with an opening 27 at its lower end. Pipe 26 may be an extension of the tubing 18 with the cage 28 attached alongside the lower portion of tubing 18 with an opening or openings in the lower portion thereof.

Cage 28 may be a length of pipe drilled full of holes of say 1¼ inch size and encompassing for example between about 40 percent and 60 percent of the total exterior surface area of the pipe. Cage 28 may also be made of screen having sufficient rigidity to maintain an unobstructed vertical passageway. A screen is desirable because it permits substantially free flow of the injected fluid within the elongated cage. The interface will then extend unobstructed into the elongated cage.

A source of fluid preferably under constant pressure is provided by supply line 30 which contains valve 32 for controlling a flow of fluid therethrough. Supply line 30 branches into lines 36 and 38 with line 36 connecting with the surface end of the annular passageway defined by the inner wall of casing 14 and the outer wall of tubing 18. Line 30 is provided with valve 32 which is any suitable control valve designed to maintain a constant flow of fluid therethrough. Branch line 36 is provided with a meter 40 for accurately measuring the amount of fluid flowing into and through the tubing and with valve 42 for regulating or adjusting this amount of fluid. Branch line 38 is likewise provided with meter 44 for measuring the fluid that flows into the annulus and with valve 46 for adjusting the flow. Valves 42 and 46 may be adjusted to permit any desired ratio of fluid injection between the tubing and the annulus.

Elongated cage 28 contains radioactive ball 48 which is preferably spherical in shape and with a diameter adapted to permit it to move freely within the cage. The material from which it is made is not critical, but it is preferably made of a thin metal such as aluminum or magnesium or a plastic such as polystyrene and coated, impregnated or otherwise provided with a radioactive substance. The ball must be light enough in weight to be carried by the interface yet sufficiently rigid not to collapse. It is desirable that the specific gravity of the ball be about equal to the specific gravity of the fluid being injected. If the fluid being injected from below the formation has a higher specific gravity than the fluid being injected from above the formation, the specific gravity of the ball should preferably be less than specific gravity of the heavier fluid but greater than the higher fluid. The ball may contain holes to equalize the pressure on the inside and the outside to prevent collapsing of the ball. It may be desirable to insert a capsule containing the radioactive substance in the ball; if this is done the holes in ball 48 should be so sized and shaped that the capsule cannot escape therefrom. Use of radioactive iodine 131 is quite satisfactory as it has a half life of approximately 8 days although this is not critical as the radioactive substance may be removed from the well after the survey has been run. When fluid is injected through the tubing 18 and pipe 26, the upward flow of fluid from the bottom of the well bore will carry ball 48 upwardly through elongated cage 28 to the interface 50 between the fluid being injected through the tubing 18 and the fluid being injected through the annulus. Interface 50 will be at a point of zero velocity in elongated cage 28.

A radioactivity detector 52 such as a conventional gamma ray logging tool is suspended in pipe 26 by line 53 which is also capable of conducting the output of detector 52 to a conventional measuring and recording unit 54 located at the surface. Adaptor 24 is provided with guide plate 56 to facilitate the lowering of detector 52 from tubing 18 into pipe extension 26. Line 53 passes over a suitable line measuring device 58 which continuously records the depth of detector 52. When detector 52 is lowered into pipe 26, it will suddenly respond as it reaches the same elevation as radioactive ball 48. As the radioactive ball 48 is at the same elevation as the interface, by reading the depth at which the response is given, the depth of the interface can thus be determined.

As the ratio of fluid injected in the annulus increases with respect to the amount of fluid being injected through the tubing 18, the interface will move downwardly in the well bore. For purposes of illustration, assume that the injection fluid is a hydrocarbon gas and that the total volume of gas being injected in determining interface 50 is at the rate of 100,000 cubic feet per day with 50,000 cubic feet of this passing through the tubing 18 and 50,000 passing through the annulus. By varying the ratio of injection whereby gas is injected through the annulus at the rate of 75,000 cubic feet per day, and gas is injected through the tubing at the rate of 25,000 cubic feet per day, the interface will be lowered to a depth 60. The section of the formation between interface 50 and interface 60 is designated as A. It is then known that section A is receiving gas at the rate of 25,000 cubic feet per day. By changing the ratio of the gas being injected through the tubing and the annulus while maintaining constant the total volume injected, it is possible to move the interface vertically over the entire formation. By making incremental changes, it is possible to obtain the injection rate for incremental segments throughout the vertical thickness of the formation. The increments may be any size desired.

This invention has many advantages over prior art. For example, no radioactive material enters the formation; therefore a gamma ray log can be made immediately after the injection profile survey is completed. No radioactive gas or fluid is released in the vicinity of personnel since the injected gas or fluid contains no added radioactive material. The only radioactive material is contained in ball 48 which is normally either in the bottom portion of the hole or in a lead container at the surface.

It should also be noted that by use of this invention, the mixing of gases by diffusion at the interface can be tolerated as ball 48 will be positioned at the point of zero velocity which is at the interface. This is especially assured if the specific gravity of the ball is approximately the same as the specific gravity of the gas. With this invention it is therefore possible to determine the injectivity profile when the fluid being injected is a gas.

This method and apparatus has been described as being used in open hole completion but it can also be used where casing has been set through the formation to be surveyed where the casing has been adequately perforated.

Figure 2:
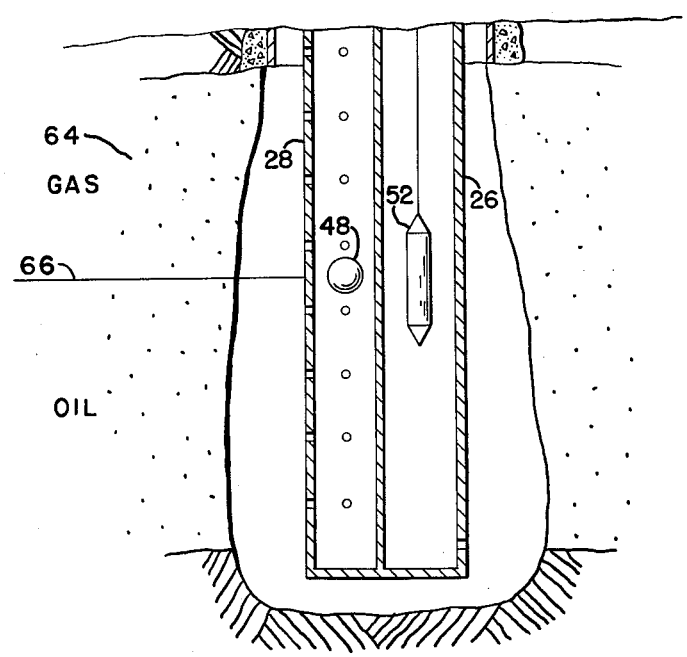
FIGURE 2 represents a vertical sectional elevation through a portion of a well and indicating a gas section and an oil section.

It is also obvious that this method may be used where it is desired to treat a particular section of a producing formation such as by injecting acid into a predetermined section to increase the well's producing characteristics. Referring to FIGURE 2, formation 64 is made up of sections of varied permeability throughout the vertical thickness of the formation. The gas/oil contact is indicated at 66 with the portion above line 66 being substantially occupied by gas and the section of the formation below line 66 being substantially the oil bearing section. Inacidizing this well it would normally be desired to acidize or inject acid only into the oil section. In using the method described in this invention, acid would be injected through tubing 26 and a fluid, such as oil, would be injected through the annular space between the casing and the well bore. The interface between these two fluids would be detected in the manner described above, that is ball 48 would be positioned at the interface and would be detected by detector 52. The ratio of the oil injected into the annulus and the acid injected through the tubing would then be adjusted until the interface as has been determined by the radioactive ball and detector 52 is at the same depth as gas/oil contact 66. By maintaining this interface the acid will be injected into the oil section.

Almost any material desired can be placed or deposited in a selected section of a formation in a manner similar to that described for controlling the injection of acid. For example, a material such as a plastic can be injected into a formation to change the surface tension, etc. and thereby change the effective permeability.

In rotary drilling of oil wells, drilling mud is normally used and is usually injected into the drill string and recirculated to the surface through the annular space between the drill string and the well bore. Occasionally the circulation is lost although drilling mud is injected through the tubing. The usual explanation is that a very porous formation has been encountered along the wall of the bore hole and the drilling mud is flowing into this porous zone. It is important to locate such zone in order that it may be sealed in some manner such as by cementing in order to prevent the continuous loss of drilling fluid or mud. It is believed to be apparent that by using the described method of determining the interface or injectivity profile that the zone may be located. This will be at a point where the interface fails to move appreciably up or down although the injecting rates are varied considerably.

It is quite apparent that other modifications and variations of this invention may be made without departing from the spirit and scope thereof and only such limitations should be imposed as are made by the following claims.

I claim:

1. The method of making a permeability log or injection profile of a subsurface formation traversed or penetrated by a well bore which comprises injecting a fluid into said formation through said well bore from above said formation, simultaneously injecting a fluid into said formation through said well bore from below said formation, thereby creating an interface between the fluid injected from above said formation and the fluid injected from below said formation, carrying a radioactive ball at and by said interface, locating said ball by a radioactivity detecting instrument, determining the depth in the well bore of said interface by measuring the depth to said ball, varying the ratio of the fluid being injected from above the formation and the fluid being injected from below the formation while maintaining constant the total amount of fluid being injected so as to move the vertical position of the interface, determining the depth of the interface at its new position and repeating these operations while determining the ratios of the fluid being injected from above the formation and the fluid being injected from below the formation with respect to the depth of each interface.

2. An apparatus for determining the injection profile of an underground formation comprising in combination a tubular support member, a pipe with an opening in its lower end and its upper end secured to the lower end of said tubular member, the bore of said pipe being in communication with the bore of said tubular member, an elongated cage supported alongside said pipe at the lower end of said tubular member and in fluid communication with the bore hole annulus, a radioactive ball retained within said cage and capable of free vertical movement therewithin, a radioactivity detector movably suspended in said pipe and responsive to radioactive impulses emitted by said ball, means for determining the depth of said detector in said pipe, means for injecting fluid into said tubular member, means for injecting fluid into the annulus defined by the outer wall of said tubular member and the wall of the well bore.

3. An apparatus of the character described comprising a tubular support member suspended within a well bore and having an opening at its lower end, an elongated cage supported by said tubular support member at its lower portion, a radioactive ball retained within said cage and capable of free vertical movement therewithin, a radioactivity detector movably suspended within said tubular support member and responsive to radioactive impulses emitted by said ball, means for determining the depth of said detector, means for injecting fluid into said tubular member, means for injecting fluid into the annulus defined by the outer wall of said tubular member and the wall of said tubular member and the wall of the well bore, said ball being of the character to move freely within said cage in response to the flow of fluid through the cage.

4. The method as described in claim 1 in which the injection rates are adjusted first to establish the interface substantially opposite the top of the formation, then adjusted to increments to move the interface downwardly along the formation wall, the position of the interface and the change in injection rates are determined after each increment.

5. The method as described in claim 1 in which the fluid injected into the formation is a gas.

6. The method as described in claim 1 in which the fluid injected into the formation is a liquid.

7. The method as described in claim 1 in which the fluid injected into the formation is water.

8. The method as described in claim 1 in which a material capable of changing the producing characteristics of a formation is to be injected into a selected section of the formation and in which said material is carried by one of the injecting fluids, and adjusting the injection rates so as to maintain the interface at the desired depth so that the liquid carrying said material will enter said selected section of the formation.

9. An apparatus for determining the injection profile of an underground formation comprising in combination a tubular support member adapted to be suspended in a well bore, a tubular member with an opening in its lower end and its upper end secured to the lower end of said tubular support member, the bore of said tubular member being in communication with the bore of said tubular support member, an elongated cage supported alongside said tubular member at the lower end of said tubular support member and in fluid communication with the bore hole annulus, a radioactive ball retained within said cage and capable of free vertical movement therewithin, a radioactivity detector movably suspended in said tubular member and responsive to radioactive impulses emitted by said ball, means for determining the depth of said detector in said tubular member, means for injecting fluid at controlled rates into said tubular support member, means for injecting fluid at controlled rates into the annulus defined by the outer wall of said tubular support member and the wall of the well bore, means for varying the ratio of the fluid volumes injected into the annulus and the tubular support member while maintaining constant the total volume of fluid injected whereby the interface between the upwardly flowing fluid and the downward flowing fluid may be varied and the depth of each variation determined.

References Cited in the file of this patent

UNITED STATES PATENTS

| | | |
|---|---|---|
| 2,456,233 | Wolf | Dec. 14, 1948 |
| 2,700,734 | Egan et al. | Jan. 25, 1955 |
| 2,714,167 | Herzog | July 26, 1955 |